UNITED STATES PATENT OFFICE.

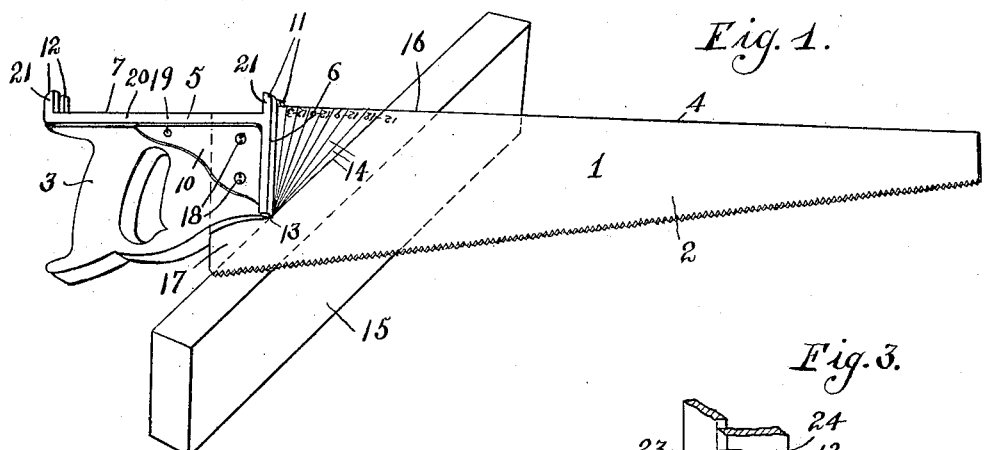
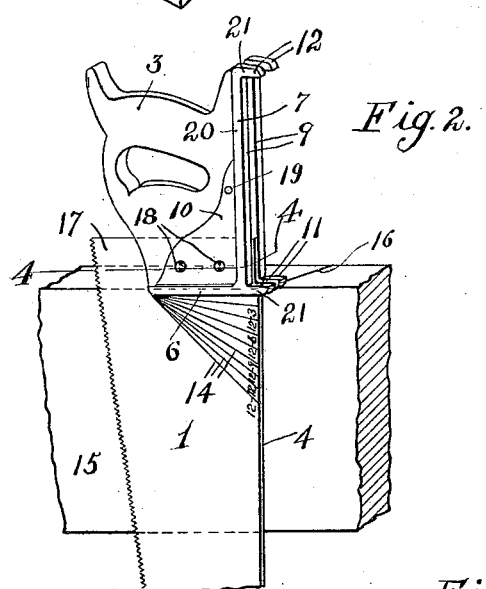
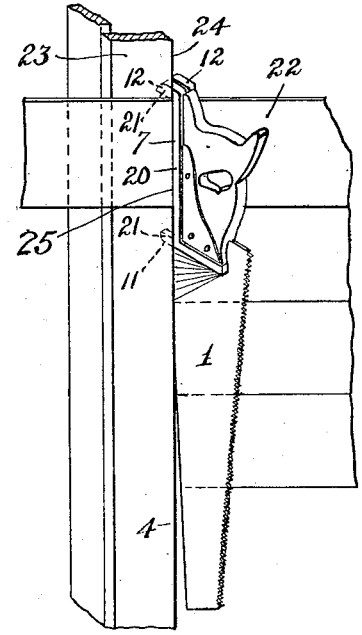
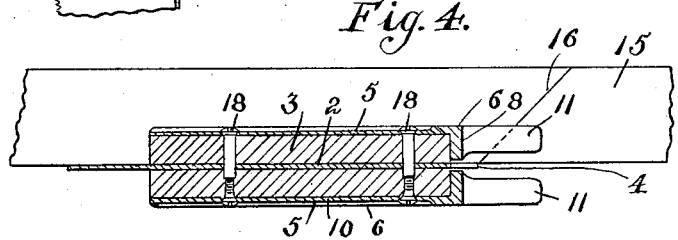

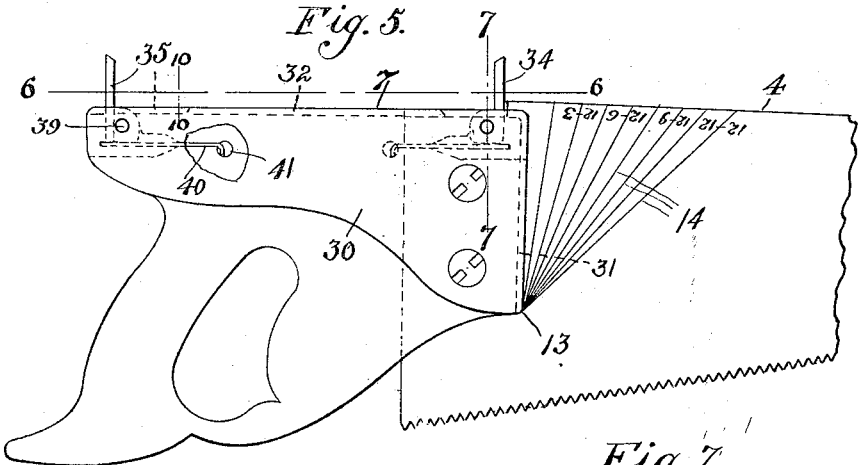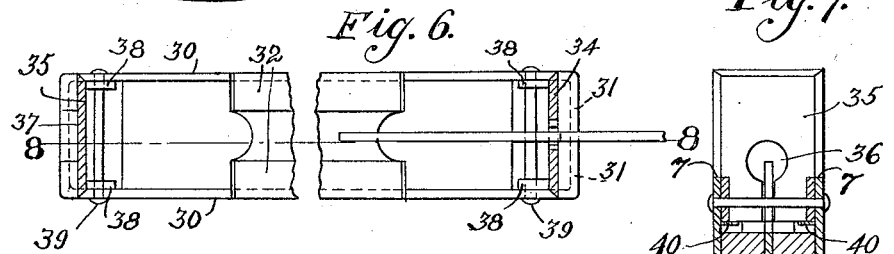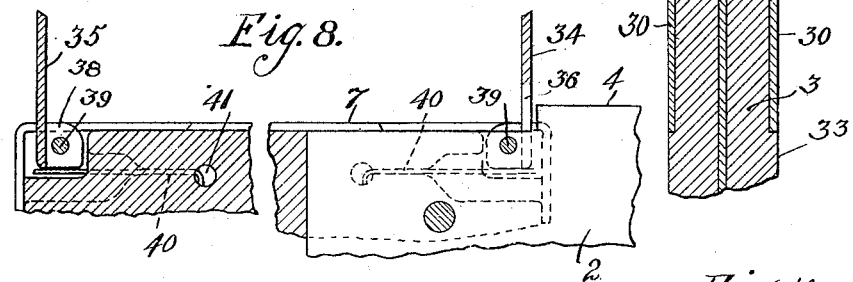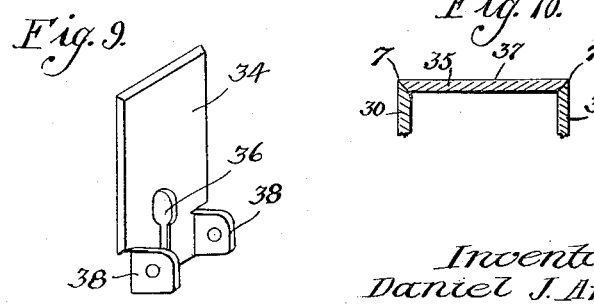

DANIEL J. ANNIS, OF PLAINFIELD, ILLINOIS, ASSIGNOR, BY DIRECT AND MESNE ASSIGNMENTS, OF TWO-NINTHS TO THOMAS C. DAVIS AND FIVE-NINTHS TO THEODOR WENSEL, OF JOLIET, ILLINOIS, AND TWO-NINTHS TO LINN COLEMAN, OF CHICAGO, ILLINOIS.

CARPENTER'S COMBINATION-TOOL.

1,138,722. Specification of Letters Patent. Patented May 11, 1915.

Application filed May 23, 1910. Serial No. 562,955.

*To all whom it may concern:*

Be it known that I, DANIEL J. ANNIS, a citizen of the United States, residing at Plainfield, in the county of Will and State of Illinois, have invented certain new and useful Improvements in Carpenters' Combination-Tools, of which the following is a full, true, clear, and exact description.

My invention relates to an improved tool for carpenters' use and has particular reference to a combination tool which unites with a saw the functions of several kinds of squares.

The object of my invention is to provide a tool which will combine with a hand saw the squares necessary for laying off boards and other wooden members preliminarily to cutting them for miter corners and for other similar purposes.

A further object is to provide a hand saw with such lines on its blade and such straight edge portions on its handle that it may conveniently be used as a try-square, a bevel or angle square and a clap-board gage or square.

My invention consists in a hand saw provided with two straight edges on its handle portion, one of which is arranged at right angles to the back or smooth edge of the saw blade, and constitutes the stock of the try-square, the saw blade being the other member thereof, and said other straight edge being arranged on the back of the handle and adapted for use as a clap-board or siding gage.

It also consists in a saw blade having lines etched or otherwise impressed on the blade and constituting, in combination with the rear or smooth edge of the saw blade, an angle or bevel gage or square.

My invention further consists in the various features of construction and combinations of parts which, being brought into one structure or member, constitutes a remarkably convenient tool, by means of which substantially all of the operations of laying out and sawing the various wooden parts of a building may be accomplished, and all as hereinafter described and particularly pointed out in the claims.

A clear understanding of my invention will be obtained by reference to the accompanying drawings forming part of this specification and in which:

Figure 1 is a perspective view of a hand saw showing the preferred embodiment of my invention and illustrating one use thereof; Fig. 2 is a view similar to Fig. 1 illustrating a second use of the invention; Fig. 3 is a perspective view illustrating the application of the invention when used in gaging or squaring clap-boards or siding; Fig. 4 is a horizontal section through the handle portion of the saw on the line 4—4 of Fig. 2; Fig. 5 is a fragmentary side elevation of a hand saw illustrating a modification of the invention; Fig. 6 is an enlarged fragmentary horizontal section on the line 6—6 of Fig. 5; Fig. 7 is an enlarged broken section on the line 7—7 of Fig. 5; Fig. 8 is a vertical longitudinal section on the line 8—8 of Fig. 6; Fig. 9 is an isometric perspective view of one of the foldable projections used in the modified form of my invention; and Fig. 10 is an enlarged detail section on the line 10—10 of Fig. 5, showing the projection 35 in its closed position.

In laying out timbers, boards and interior finish generally, the usual operations consist in marking the pieces with lines either square or at various angles to the sides or edges in order that the pieces may be cut to fit in their desired places. It is frequently necessary to cut the ends of boards or " trim " to fit together at various angles to form mitered or beveled corners. It is for this purpose of marking the pieces to be cut, with the proper lines, in order to be able to cut them at the desired angles, that my invention is especially adapted. Also in the process of finishing a building with clap-boards or siding, it is necessary to cut the clap-boards or siding to the proper length to fit between the upright or vertical members on the building, such as door frames, window frames and corner boards. The usual method is to place a piece of siding in its desired position with one of its ends against one of the vertical members, the siding being long enough to project beyond the other vertical member, and then by some means draw a line across the siding indicating where it should be cut off to fit against the vertical member over which it projects.

My combination tool is particularly adapted for marking the siding for cutting it off to fit in its desired position.

As illustrated in Figs. 1 to 4, the preferred form of my invention comprises a hand saw 1, having a blade 2 and a handle 3, the rear or smooth edge 4 of the blade being straight. On each side of the handle are mounted reinforcing members 5, substantially L shape in side elevation, and having two straight edge portions 6 and 7. The straight edge portions 6 and 7 are provided with inwardly turned flanges 8 and 9 respectively which are let into the body of the handle 3 and form permanent straight edges for the various uses for which the tool is adapted. The portions or legs 6 and 7 are joined and strengthened by corner plates 10 integral therewith, said plates lying flat against the side faces of the handle 3. The straight edges 6 of the members 5 are arranged at right angles to the rear edge 4 of the saw blade and constitute what might be termed the base or stock of a try-square, the blade of the saw forming the other member thereof. The rear edges 7 of the said members 5 are arranged slightly out of line with the rear edge 4 of the saw blade for a purpose hereinafter described. They extend substantially the full length of the rear of the handle and are provided at their ends with rearwardly projecting lugs 11 and 12. These lugs with the straight edges 7 constitute what I term the siding gage or square, the application of which is hereinafter described. The straight edge portions 6 of said members 5 extend across the forward end of the handle 3, and the corner 13 thereof, adjacent to the cutting edge of the saw, constitutes a shoulder or pivot which, in conjunction with the rear edge 4 of the saw blade, constitutes or forms a bevel or angle square. When it is desired to mark the edge of a board on an angle, in order to cut the board to fit some desired bevel, the saw is placed upon the edge of the board, as illustrated in Fig. 1, with the shoulder 13 in contact with the side face of the board and the blade of the saw laid flat upon the edge of the board. The saw is now swung around on the shoulder 13 as upon a pivot until the back edge of the saw is set at the proper angle to the edges of the board. To assist in adjusting the saw to the angle desired, diagonal lines 14 are etched or otherwise impressed upon the side faces of the saw blade, adjacent to the handle end thereof, radiating from the shoulder 13 as a center and projecting toward the back edge 4 of the saw at various angles thereto. These lines are marked or designated in the usual way, the 45 degree line being designated 12—12 which indicates that the length of the back of the saw from the point where this line meets the same to the edge 6 is equal to the length of the edge 6 from the back of the saw to the corner 13. Other lines are designated in other proportions as 12—9 and 12—6 etc.

The position shown in Fig. 1 illustrates the use of the saw in marking the 45 degree or miter line on the edge of the board 15, the line being marked along the rear edge 4 of the saw at 16. The rear edge 4 of the saw is arranged to project slightly beyond the rear straight edge 7 so that it may be seen from the handle end of the saw between the projections 11 of the members 5. The end 17 of the saw blade, to which the handle is secured, is notched or cut down at its edge between the members 5 so that it will not interfere with the use of the rear straigh edge 7 as a siding gage.

The board 15 having had its edge marked, as indicated in Fig. 1, it is now desirable or necessary to mark the face of the board so that the saw cut may be made squarely across the board. In Fig. 2 I have illustrated the application of the saw for this purpose of marking the face of the board. The straight edge or stock 6 is placed against the edge of the board and the rear edge 4 of the saw is brought into alinement with the end of the line 16 on the edge of the board. The saw can readily be adjusted to this position as the rear edge 4 of the saw can be clearly seen between the projections 11, as illustrated in Fig. 4.

The members 5 are secured to the handle and to the saw by rivets or bolts 18 passing through said members and the handle end 17 of the saw blade. The rivet or bolt 19 secures the members solidly to the handle adjacent to the middle portion thereof. The plates 10 of said members 5 are preferably sunk a little below the side faces 20 of the straight edge portions 6 and 7 of said members 5, and the side faces 21 of the projections 11 and 12 lie in the plane of the side faces 20 of the edge portions 6 and 7.

The application of my tool as a siding gage or square is clearly illustrated in Fig. 3. The clap-board 22 which is being fitted lies upon and projects over the corner board 23 and the saw is placed in vertical position with the straight edge 7 against the face of the clap-board 22, and the side faces of the projections 11 and 12 in contact with the inner edge 24 of the corner board 23. The siding is then marked for cutting off along the straight edge 7 at 25.

The reinforcing members 5 are designed to be made of castings or drop forgings as the most convenient method of manufacture, whereby the projections 11 and 12 may be made integral with the members 5.

The straight edge 7 is arranged at a slight angle to the back or rear edge 4 of the saw blade, so that when the tool is used as a clap-board or siding gage the siding which is already in place, on the building, will not interfere with the placing of the saw in its proper position, the rear edge 4 of the saw extending in front of and out of contact with the completed siding.

In Figs. 5 to 9 I have illustrated a modified form of construction of the reinforcing members whereby they may be manufactured or formed up out of sheet metal. The projecting lugs forming the ends of the siding gage in this form are arranged to fold down flush with the straight edge on the rear of the handle. In said modified form the reinforcing members comprise side plates 30 having turned over flanges 31 along their forward ends arranged to stand at right angles to the back 4 of the saw blade and form the stock of the try-square. They also have turned over flanges 32 along the back or rear edge of the handle which form the straight edge portion of the siding gage. The plates 30 are preferably let into the body of the handle so that their outer faces are flush with the side faces 33 of the handle, thus doing away with projecting edges which might interfere with the hand of the user. To form the lugs or projections for the ends of the siding gage, I provide pivoted members 34 and 35 mounted on rivets or pivots adjacent to the rear edge of the handle portion and adapted at one limit of their movement to stand extended substantially at right angles to the straight edge portion 7 as indicated in Figs. 5, 7 and 8, and at the other limit of their movement to be folded down with their outer faces flush with said straight edge 7 as indicated in dotted lines in Fig. 5 and in full lines in Fig. 10. Said members 34 and 35 are substantially alike, except that the member 34, which is mounted adjacent to the forward end of the handle is provided with a central opening 36 through which the rear edge 4 of the saw blade may be seen when the member 34 is in its outer or extended position. In order that the members 34 and 35 may have their side edges arranged in the planes of the side faces of the member 30 and yet fold down flush, said side edges are beveled and the rear edges of the plates 30 are correspondingly beveled, as indicated in the detail section illustrated in Fig. 10. Said members 34 and 35 are provided with ears 38, adapted to lie inside of the side plates 30 and receive the pivots or bolts 39. To hold said members 34 and 35 in their proper positions at the limits of their movement, flat springs 40 are provided. The springs 40 are mounted in recesses formed in the side faces of the handle of the saw beneath the side plates 30. One end of these springs 40 projects beneath the ears 38 of the members 34 and 35, and each is adapted to engage flattened portions on the edges of said ears to hold said members in the desired positions. The inner ends of the springs are bent over at right angles and are received within openings 41 in the handle and the springs are thus prevented from moving out of their proper positions. The wood of the handle is cut away at its rear edge to permit the mounting and operating of the members 34 and 35, as described.

The application or use of the modified form is identical with that of the preferred form except that the projections may be folded down except when it is desired to use the tool as a siding gage.

As many modifications of the details of structure will readily suggest themselves to those skilled in the art, I do not limit myself to the exact structure shown and described.

Having thus described my invention, I claim as new and desire to secure by Letters Patent:

1. A carpenter's hand tool comprising a hand grip handle having a straight front end and containing a blade slot, in combination with a straight edged blade wider than said front end and secured in said slot with its straight edge at right angles to said front end of the handle, the back of said handle being below and diverging from the projected line of said blade edge, and said back of the handle being provided with upstanding gage lugs or projections containing sight gaps in sight alinement with said back edge of the blade.

2. A carpenter's tool comprising a hand grip handle having a blade slot in its front end, in combination with L-shaped metal members secured to opposite sides of said handle and forming a straight front end and a straight back or top thereon, the angle between the front and back portions of said members being less than a right angle, and said members having gage lugs or projections upstanding from the ends of their back portions.

3. A carpenter's tool comprising a hand grip handle having a blade slot in its front end, in combination with L-shaped metal members secured to opposite sides of said handle and forming a straight front end and a straight back or top thereon, the angle between the front and back portions of said members being less than a right angle, gage lugs or projections upstanding from the ends of said back portions, and a blade secured in said slot and presenting a straight edge at right angles to the front portions of said members.

4. A carpenter's hand tool comprising a hand grip handle having a straight front end and containing a blade slot, in combination with a straight edged blade wider than said front end and secured in said slot with its straight edge at right angles to said front end of the handle, the back of said handle diverging from the projected line of said blade edge, and said back of the handle being provided with upstanding siding gage lugs one at the juncture of the blade and handle and having a sight gap, for the purposes described.

5. A carpenter's hand tool comprising a hand grip handle having a straight front end slotted to receive a blade, a blade fixed therein and having a back edge at right angles to said front end, siding gage lugs provided upon the front and rear ends of said handle and the forward lug containing a sight gap through which the juncture of the saw back and the front end of the handle may be seen.

6. A carpenter's hand tool, comprising a blade having in combination with a handle presenting straight edges perpendicular to the back of said blade, a siding gage upon the back of said handle and having lugs projecting beyond the projected line of said back of the blade, the forward lug being at the juncture of the blade and handle and having a sight gap through which the juncture corner thereof may be seen.

In testimony whereof, I have hereunto set my hand, this 18th day of May, 1910, in the presence of two subscribing witnesses.

DANIEL J. ANNIS.

Witnesses:
 EDWARD C. LOHNER,
 B. F. POWELL.

Copies of this patent may be obtained for five cents each, by addressing the "Commissioner of Patents, Washington, D. C."